Sept. 14, 1948.　　　B. HENRICKSEN　　　2,449,117
CONVEYER
Original Filed June 2, 1943　　　4 Sheets-Sheet 1
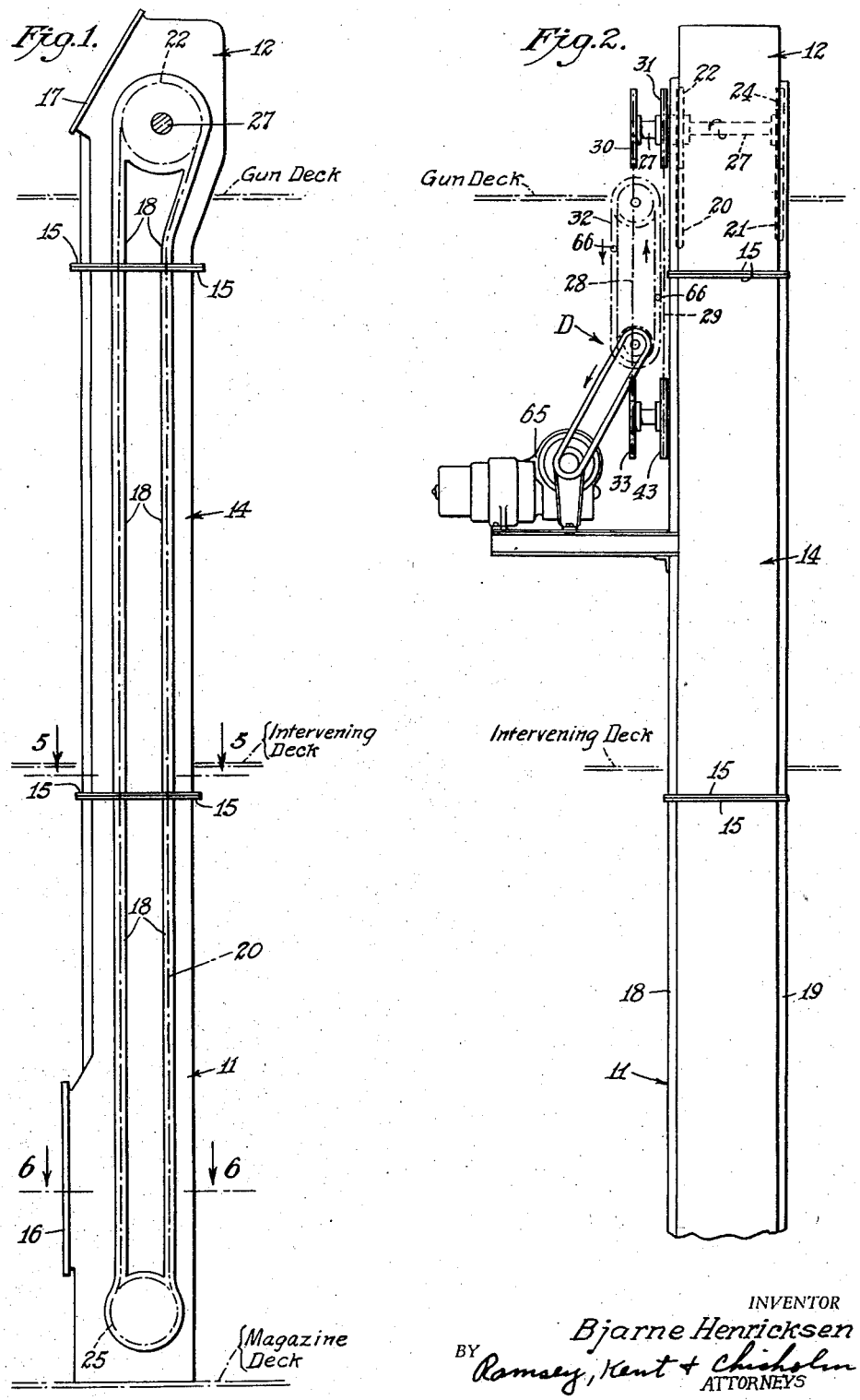
INVENTOR
Bjarne Henricksen
BY Ramsey, Kent + Chisholm
ATTORNEYS

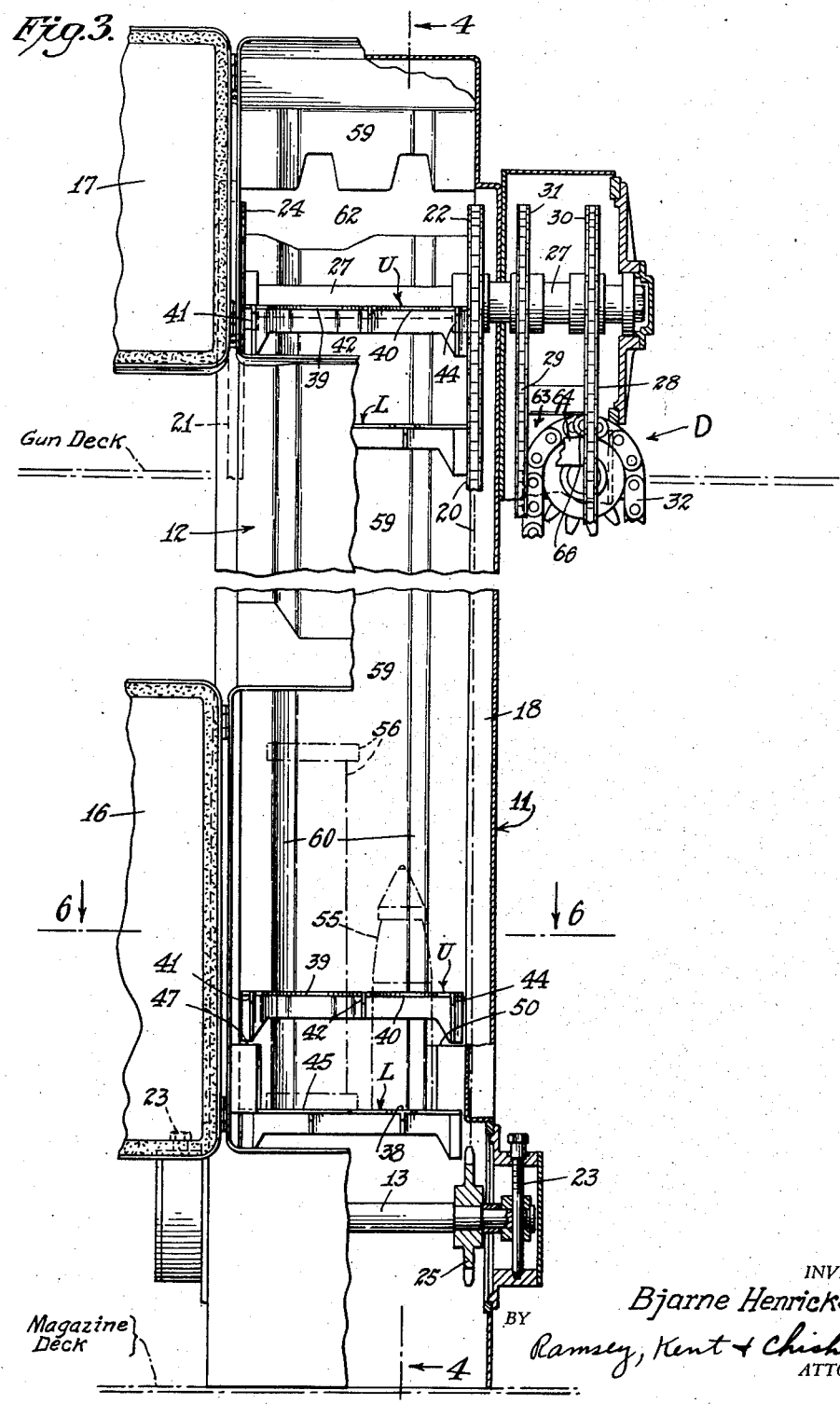

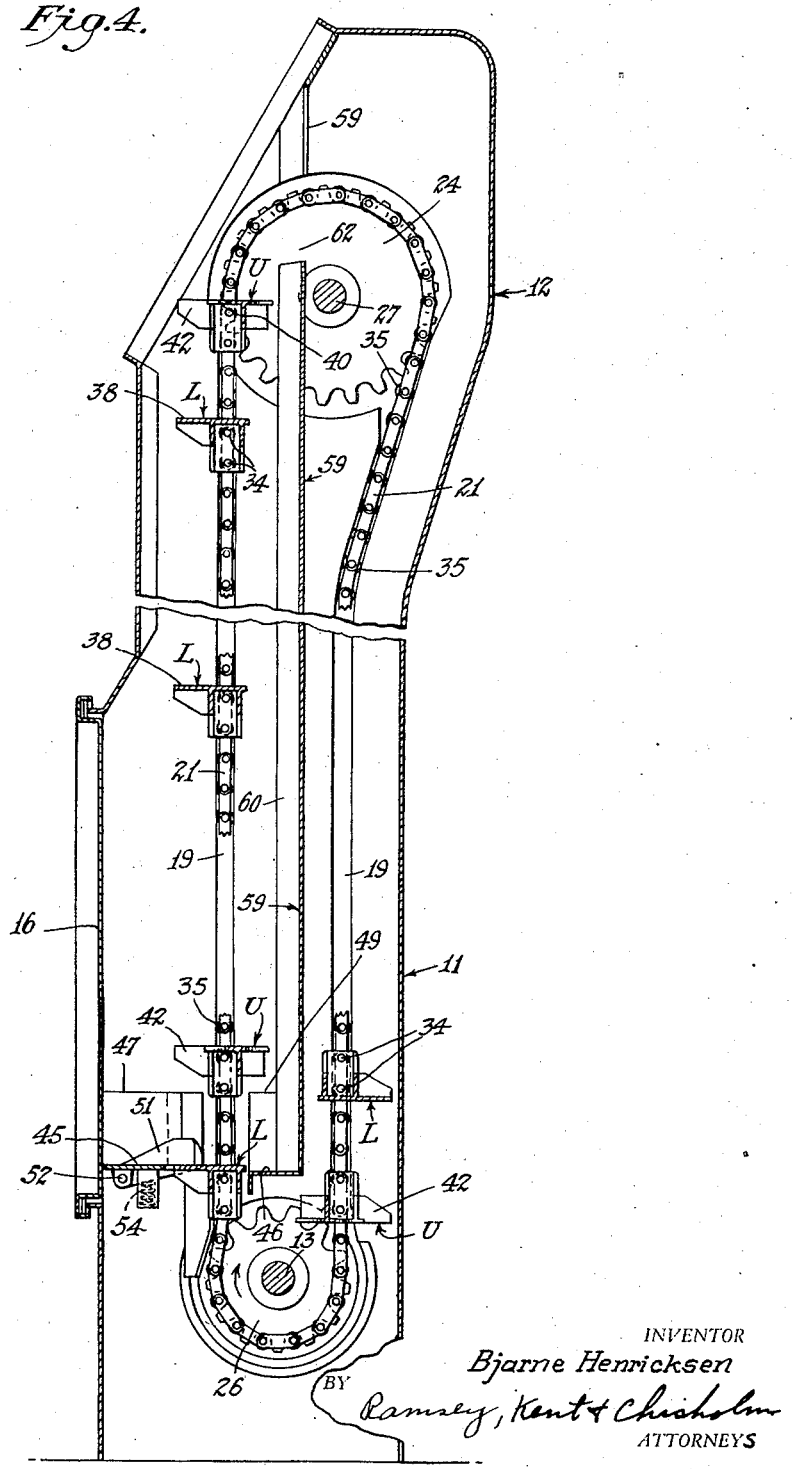

Sept. 14, 1948.     B. HENRICKSEN     2,449,117
CONVEYER
Original Filed June 2, 1943     4 Sheets-Sheet 4
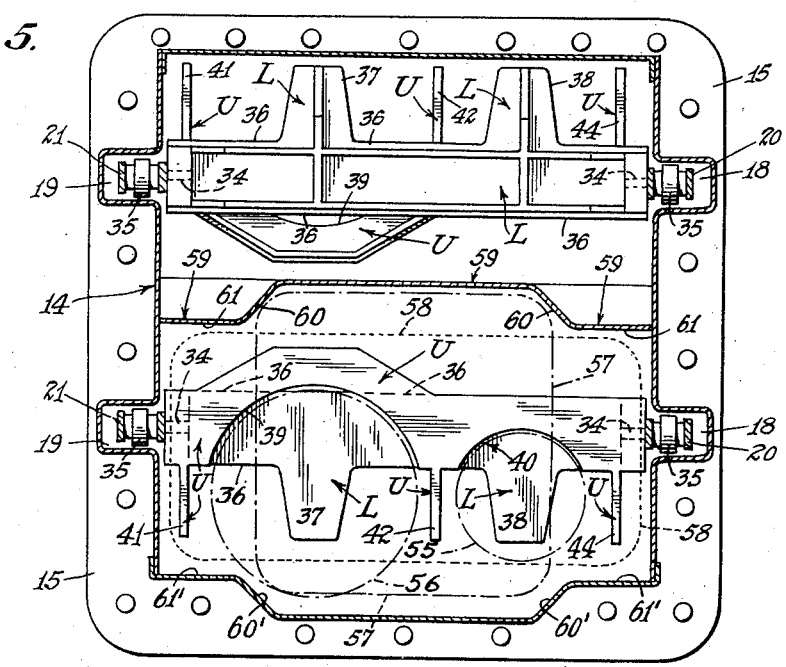
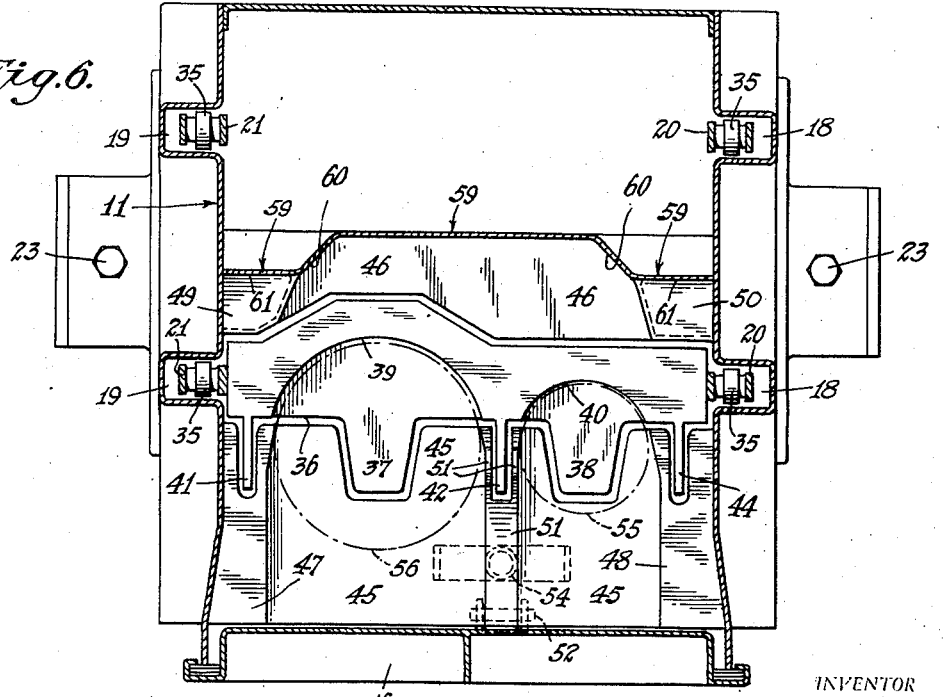
INVENTOR
Bjarne Henricksen
BY
Ramsey, Kent & Chisholm
ATTORNEYS Patented Sept. 14, 1948

2,449,117

UNITED STATES PATENT OFFICE 2,449,117

CONVEYER

Bjarne Henricksen, Cliffside Park, N. J., assignor to Sedgwick Machine Works, Inc., Poughkeepsie, N. Y., a corporation of New York Original application June 2, 1943, Serial No. 489,325. Divided and this application October 13, 1945, Serial No. 622,113

3 Claims. (Cl. 198—206)

1

This invention relates to conveyors, and this application is a division of my application Serial Number 489,325, filed June 2, 1943, and issued December 4, 1945, as Patent No. 2,390,302.

Certain features of the invention are applicable to vertical, horizontal, or inclined conveyors used to transport articles from location to location. For convenience I include loose material within the term "article." The particular embodiment of the invention which will be disclosed and discussed is an ammunition hoist, intended for conveying ammunition from the magazine deck of a ship to a gun deck and vice versa.

Among the objects of the invention are: the provision of a conveyor which lends itself to a large amount of prefabrication of standardized parts usable in a variety of installations; the provision of a conveyor having an inclosure or shaftway which can be expeditiously assembled from standardized prefabricated parts; the elimination of conveyor guide means requiring separate mounting when the conveyor is installed; and the provision of a conveyor inclosure or shaftway of such construction as to enable it to guide the conveyor in desirable fashion.

Further objects, and objects relating to details and economies of construction and operation will more definitely appear from the detailed description to follow. My invention is defined in the appended claims. In the claims, as well as in the description, parts are at times identified by specific names for clarity and convenience but such nomenclature is to be understood as having the broadest meaning consistent with the context and with the concept of my invention as distinguished from the pertinent prior art. The best form in which I have contemplated applying my invention is illustrated in the accompanying drawings forming a part of this specification, in which:

Fig. 1 of the drawings is a diagrammatic side elevation of an ammunition hoist embodying the present invention. The drive for the hoist is omitted for clarity.

Fig. 2 is a diagrammatic elevation looking from the rear of the hoist and showing the drive.

Fig. 3 is a partly diagrammatic front elevation, with portions in vertical section, showing primarily the loading and unloading stations and associated portions of the conveyor.

Fig. 4 is a partly diagrammatic vertical section showing primarily the loading and unloading stations and associated portions of the conveyor. The view is taken approximately on the line 4—4 of Fig. 3.

2

Fig. 5 is a horizontal section taken on the line 5—5 of Fig. 1.

Fig. 6 is a horizontal section taken approximately on the line 6—6 of Figs. 1 and 3.

Reference will first be had to Figs. 1 and 2. The hoist is inclosed within a casing that is preferably water-tight This casing includes a lower trunk section 11, an upper trunk section 12, and any desired number of intervening trunk sections 14 (one shown). These trunk sections are prefabricated from sheet steel and may be of pressed and welded construction. Integral with the trunk sections are flanges 15 arranged to be bolted together. The hoist shown extends from a magazine deck, through one intervening deck, and discharges just above a gun deck. By the use of additional sections 14, the height of the hoist may be increased as desired, and the hoist may pass through any desired number of intervening decks.

Closures 16 and 17 are provided at the loading and unloading stations, respectively. These closures are water-tight and may be either removable covers or hinged doors. For convenience of reference, the "front" of the hoist is considered to be the side on which these closures are located.

The articles are hoisted, as will be described later, by endless link chains 20 and 21. These chains run over upper sprockets 22 and 24 respectively, and lower sprockets 25 and 26, respectively (see also Fig. 4). The lower sprockets are idlers mounted on a shaft 13 (Fig. 3) the journals of which are shiftable by screws 23, 23 to tighten the chains. The branches of the chains are guided by inwardly facing guide channels at 18, 18 and 19, 19 respectively (see also Figs. 4, 5 and 6). As shown in Fig. 1, the guide channels direct the hoisting and return branches of the chains toward each other, thereby diminishing the front to rear dimension of the conveyor casing.

The chain guide channels may be formed by angle irons welded or riveted to the inside of the trunk sections. However, space and weight may be saved by pressing the channels 18 and 19 directly into the side walls of the trunk sections, as shown in Figs. 5 and 6.

Upper sprockets 22 and 24 are driven by a shaft 27 which projects through the side wall of trunk section 12, as shown in Fig. 2. The drive for shaft 27 is designated as a whole by D. It includes two depending endless link chains 28 and 29 which pass over upper sprockets 30 and 31, respectively, and over lower sprockets 33 and 43, respectively. The upper sprockets are mounted on conveyor shaft 27; and chains 28 and 29 are driven in start-stop manner by another endless link chain 32, as will be described later.

The drive D is shown positioned beneath shaft 27 and alongside of the conveyor casing. It should be noted, however, that the drive may be placed in any radial position with respect to shaft 27. For example, the drive may be so located that chains 28 and 29 extend in a horizontal direction or in any inclined direction. This permits the drive to be placed in various positions, according to the space available in various installations. Preferably the drive D is inclosed in its own housing, which is not shown except for a fragment in Fig. 3. Such housing may be of watertight construction.

Reference will now be had to Figs. 3, 4, 5 and 6. The articles to be hoisted are received by shelves or flights which are carried by the hoisting chains 20 and 21, and which bridge the space between the chains. These flights are arranged in pairs, the pairs being at intervals along the chains, and each pair including an upper flight designated as a whole by U and a lower flight designated as a whole by L. The ends of the flights have depending portions which are affixed to two consecutive knuckle pins 34 of the hoisting chain, those particular pins being made extra long for that purpose. All of the knuckle pins of the hoisting chains are encircled by rollers 35 which roll in the guide grooves at 18, 18 and 19, 19.

The top faces of lower flights L have rectangular portions 36 and forwardly projecting tongues 37 and 38. The bottom faces of the lower flights have suitable reenforcing ribs, as shown at the top of Fig. 5 where the lower flight L is in inverted position on the return branches of the hoisting chains. The upper flights U are of irregular shape, having arcuate cut-outs at 39 and 40, and having forwardly projecting fingers 41, 42 and 44. The bottoms of the upper flights also have suitable reenforcing ribs.

At the loading station there are upper and lower loading tables on which are placed the articles that are to be hoisted. These tables are so subdivided and cut out that the flights U and L move through them and pick up the articles. These are shown in Figs. 3, 4 and 6. The lower loading table has a forward table surface 45, and a rear table surface 46. The upper loading table is built up from the sides of the lower table and is in the form of two forward supporting ledges and two rearward supporting ledges. The forward ledges are at 47 and 48, and the rearward ledges are at 49 and 50. The upper loading table may be at any suitable height above the lower loading table, and in some cases I place it at a higher level than is shown in the drawings.

The forward surface 45 of the lower table is divided by a depressible divider 51 (Figs. 4 and 6) which is pivoted at 52 beneath the table. Coil spring 54 biases this divider upwardly through a suitable slot in the table. This divider comes into play in loading 5″ projectiles and the powder containers therefor. The space to the right of the divider is arranged to receive a 5″ projectile 55 and guide it into the arcuate cut-out 40 in the upper flight U. The space to the left of the divider is arranged to receive the companion powder container 56 and guide it into the arcuate cut-out 39 in the upper flight. As the hoist advances, tongues 38 and 37 on the lower flight L move up against the bottoms of the projectile and powder container respectively and pick them up.

Fig. 5 shows how a box 57 of 40 mm. ammunition fits into the conveyor. In loading such a box it is placed on one end on the lower loading table and its weight depresses divider 51 flush with the table. The box is put in place in time to be picked up by the upper flight U. Fig. 5 also shows how a box 58 of 20 mm. ammunition fits into the conveyor. This box is placed on the upper loading table in time to be picked up by the upper flight.

Each of the trunk sections is divided by a longitudinal partition plate 59. The flights hoist on one side of the plate and return on the other. Fig. 5 shows how this plate is pressed to form guide surfaces 60, 60 for box 57 and guide surfaces 61, 61 for box 58. The front walls of the trunk sections are pressed in such shape as to form companion guide surfaces 60', 60' and 61', 61'. The corners between surfaces 60' and 61', 61' act as guides for the 5″ projectile and its powder container. In bottom trunk section 11 the partition 59 terminates at a point permitting the flights to pass beneath it as the chains pass around the lower sprockets 25 and 26. In top trunk section 12 the flights may either pass over the top of partition 59 or through a hole 62 in it and of such shape as to permit the flights to pass through.

The drive D (Figs. 2 and 3) include chains 28 and 29 which drive the conveyor shaft 27. Arranged at intervals along these chains are internal cams, one of which is shown in Fig. 3. The cam is designated as a whole by 63 and is formed by two cam sections 64. These cams bridge the space between the chains and are attached to special connecting links which form a part of the chains. The length of the cams is slightly less than the space between sprockets 30 and 31, so that the cams can be carried past the sprockets. Located between the branches of chains 28 and 29 is the endless link chain 32 which lies in a plane perpendicular to the planes of chains 28 and 29. Chain 32 passes over suitable upper and lower sprockets, the lower sprocket being driven from electric motor unit 65. Two cam rollers 66, 66 are carried by chain 32, being mounted on special knuckle pins of the chain. The motor unit includes suitable gearing and may include an electromagnetic clutch through which starting and stopping of the hoist is controlled while the motor is left running. A suitable brake is included to automatically hold the hoist whenever the hoist is stopped. Such brake may be of the type shown in Henricksen U. S. Patent 2,042,937, June 2, 1936.

The arrangement is such that one roller 66 enters one cam 63 just before the other roller 66 leaves another cam 63. When the entering roller is in dead center position, the chains 28 and 29 (and also the hoisting chains 20 and 21) are at a standstill. During the next quarter turn of the sprockets of chain 32, the hoist is accelerated. Thereafter the hoist moves at a speed equal, or proportional, to the speed of chain 32 until the roller 66 starts to slow down on reaching the other sprocket of chain 32. It will be apparent that with chain 32 driven at constant speed, the hoist will advance in start-stop fashion, i. e., step-by-step. The drive is, of course, so coordinated with the hoist that the pauses occur when the hoisting flights are in station position for loading and unloading.

The drive D is more fully disclosed in my application Serial Number 489,325, of which this is a division. That application also discloses an electrical control circuit which may be used advantageously to control the operation of the hoist.

What I claim is:

1. A conveyor comprising: a pair of endless chains positioned in spaced relation, a metal trunk enclosing the chains, a longitudinally extending partition separating the load-carrying and return branches of the chains, and a series of shelf-like conveyor elements mounted on the chains, a wall of the trunk adjacent the load-carrying branch of the chains being longitudinally channeled to assist in maintaining conveyed articles in desired position on the conveyor elements.

2. A conveyor comprising: a pair of endless chains positioned in spaced relation, a metal trunk enclosing the chains, a longitudinally extending partition separating the load-carrying and return branches of the chains, and a series of shelf-like conveyor elements mounted on the chains, a wall of the trunk adjacent the load-carrying branch of the chain and a wall of the partition each being deformed to provide longitudinally extending formations which aid in maintaining conveyed articles in desired position on the conveyor elements.

3. A conveyor comprising: a pair of endless chains positioned in spaced relation, a metal trunk enclosing the chains, a longitudinally extending partition separating the load-carrying and return branches of the chains, a series of shelf-like conveyor elements mounted on the chains for conveying articles through the trunk, and a series of racks mounted on the chains between the conveyor elements for laterally supporting conveyed articles, a wall of the trunk adjacent the load-carrying branch of the chains being deformed to cooperate with the racks in maintaining conveyed articles in desired position on the conveyor elements.

BJARNE HENRICKSEN.

REFERENCES CITED

The following references are of record in the file of this patent:

UNITED STATES PATENTS

| Number | Name | Date |
|---|---|---|
| 777,361 | Wymer | Dec. 13, 1904 |
| 784,622 | Lindemann et al. | Mar. 14, 1905 |
| 1,152,371 | Meyer | Aug. 31, 1915 |
| 1,245,580 | Gilman | Nov. 6, 1917 |
| 1,366,103 | Sturtevant | Jan. 18, 1921 |
| 1,395,985 | Meyer | Nov. 1, 1921 |
| 1,395,986 | Meyer | Nov. 1, 1921 |
| 1,437,415 | Hauter | Dec. 5, 1922 |
| 1,457,562 | Thomas | June 5, 1923 |
| 1,497,602 | Stebbins | June 10, 1924 |